US008448857B2

(12) United States Patent
Davis et al.

(10) Patent No.: US 8,448,857 B2
(45) Date of Patent: May 28, 2013

(54) RADIO FREQUENCY IDENTIFICATION SYSTEM FOR INVENTORY HANDLING, TRACKING, AND CHECKOUT

(75) Inventors: Brian Jeffrey Davis, Raleigh, NC (US); Timothy Clay Doyle, Cary, NC (US); Todd Donald McCormack, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 936 days.

(21) Appl. No.: 11/952,590

(22) Filed: Dec. 7, 2007

(65) Prior Publication Data
US 2009/0145965 A1 Jun. 11, 2009

(51) Int. Cl.
*G06F 19/00* (2006.01)

(52) U.S. Cl.
USPC .......................................................... 235/383

(58) Field of Classification Search
USPC .................. 235/383, 385, 439, 449, 462.46, 235/472.02; 902/8–10
See application file for complete search history.

(56) References Cited

U.S. PATENT DOCUMENTS

| | | | |
|---|---|---|---|
| 4,909,356 A | 3/1990 | Rimondi et al. | |
| 5,149,947 A * | 9/1992 | Collins, Jr. ...................... | 186/59 |
| 5,437,346 A | 8/1995 | Dumont | |
| 5,531,366 A * | 7/1996 | Strom ........................... | 224/153 |
| 5,540,301 A | 7/1996 | Dumont | |
| 5,550,547 A | 8/1996 | Chan et al. | |
| 6,056,087 A | 5/2000 | Addy et al. | |
| 6,155,486 A | 12/2000 | Lutz | |
| 6,318,636 B1 | 11/2001 | Reynolds et al. | |
| 6,910,697 B2 | 6/2005 | Varatharajah et al. | |
| 7,133,843 B2 | 11/2006 | Hansmann et al. | |
| 7,248,164 B2 | 7/2007 | Regard | |
| 7,357,299 B2 * | 4/2008 | Frerking ........................ | 235/375 |
| 7,471,205 B2 * | 12/2008 | Garber et al. ............... | 340/572.4 |
| 7,821,400 B2 * | 10/2010 | Tabet et al. ................. | 340/572.4 |
| 2002/0079367 A1 * | 6/2002 | Montani ........................ | 235/383 |
| 2003/0015585 A1 * | 1/2003 | Wike et al. .................... | 235/383 |
| 2006/0266824 A1 * | 11/2006 | Hassenbuerger ............. | 235/383 |

* cited by examiner

*Primary Examiner* — Seung Lee
(74) *Attorney, Agent, or Firm* — Patterson & Sheridan, LLP

(57) ABSTRACT

One embodiment provides a method of handling for-sale items while shopping at a brick-and-mortar store, including inventorying, tracking, and scanning the for-sale items at checkout. Customers select and bag items while they shop. Each item includes an RFID tag uniquely identifying the item or category of item. The customer brings the shopping cart to an unloading zone of a checkout station. Another, empty shopping cart is positioned in an unloading zone. The customer may receive electronic guidance in positioning the shopping carts. As the customer moves the bags from the shopping cart in the unloading zone to the shopping cart in the loading zone, the bags are scanned by the RFID scanner without removing the items from the bags. Redundant RFID scanners may be provided to increase reliability, and a UPC scanner may be provided as a backup. The shopping carts at the loading zone and unloading zone may be weighed and the weights compared, to guard against possible theft of goods.

19 Claims, 4 Drawing Sheets

RADIO FREQUENCY IDENTIFICATION SYSTEM FOR INVENTORY HANDLING, TRACKING, AND CHECKOUT

BACKGROUND OF THE INVENTION

1. Field of the Invention

The present invention relates to methods of tracking goods at a brick-and-mortar store, with particular emphasis on arranging and scanning the goods to expedite checkout.

2. Description of the Related Art

Within supply chain management, there is considerable interest in supplementing or replacing the current UPC (Universal Product Code) scheme used to uniquely identify and track inventory items using barcodes. The current UPC scheme is a barcode symbology that, among other things, has already greatly improved the speed and accuracy of "checkout" at grocery stores. The UPC scheme allows each item for purchase to be scanned in with an optical scanner, one item at a time, and cross-referenced with an electronic database containing price information for the associated item. This approach has largely replaced older methods of manually typing in the price of each item on a cash register. Individually tagging items with UPC barcodes can therefore reduce incidences of lost, stolen, or spoiled goods, improve the efficiency of demand-driven manufacturing and supply, facilitate the profiling of product usage, and improve the customer experience. However, one disadvantage of item tracking using the UPC scheme is that reading a barcode requires an optical line-of-sight and in some cases appropriate orientation of the bar code relative to the sensor. Also, items with barcodes must be scanned one item at a time. Additionally, damage to even a relatively minor portion of the bar code can prevent successful detection and interpretation of the bar code.

Various item-tracking solutions using radio frequency identification (RFID) tags have been proposed as a substitute for using bar codes in supply chain management and, in particular, supermarket checkout systems. RFID-based scanning systems typically involve an active scanning device, and a transponder in the form of an active, passive, or semi-passive RFID tag affixed to each item. RFID tags can be read from up to several meters away, and RFID scanners are capable of multi-directional reading, allowing RFID tracking systems to scan for multiple items in the vicinity of the scanner. Efforts to implement conventional RFID-based scanning systems have, therefore, largely been directed to scanning an entire shopping cart full of items at once, in an effort to save time over the traditional checkout process where item bar codes are manually scanned in one at a time. However, difficulties have arisen in obtaining an accurate accounting of shopping cart contents, due primarily to the size and volume of a typical shopping cart. Items near the center of a cart are not reliably detectable with an RFID scanner using existing technology.

Despite the shortcomings of previously-proposed RFID-based product scanning systems, however, RFID technology remains a powerful tool with a great deal of potential for use in supply chain management, inventory management, and, in particular, for expediting checkout at supermarkets and other shopping venues. Therefore, an improved inventory scanning solution is desired.

SUMMARY OF THE INVENTION

According to one embodiment of the invention, a plurality of for-sale items are provided in a brick-and-mortar store. A remotely machine-readable identification tag is applied to each item, wherein each identification tag uniquely identifies the item or category of item to which the identification tag is applied. A plurality of shopping bags are provided to a customer, the customer selecting some of the for-sale items, placing one or more of the selected items in each shopping bag, and transporting the filled shopping bags in a first shopping cart to a checkout station. The first shopping cart is positioned at an unloading zone at the checkout station. A second shopping cart is positioned at a loading zone at the checkout station. The filled shopping bags are moved from the first shopping cart to the second shopping cart. At least one tag-reading machine is used to remotely machine-read all of the identification tags in each shopping bag being moved to the second shopping cart without removing the items from the shopping bag. Each item having an identification tag is identified in response to the machine-reading.

Other embodiments, aspects, and advantages of the invention will be apparent from the following description and the appended claims.

DETAILED DESCRIPTION OF PREFERRED EMBODIMENTS

Figure 1:
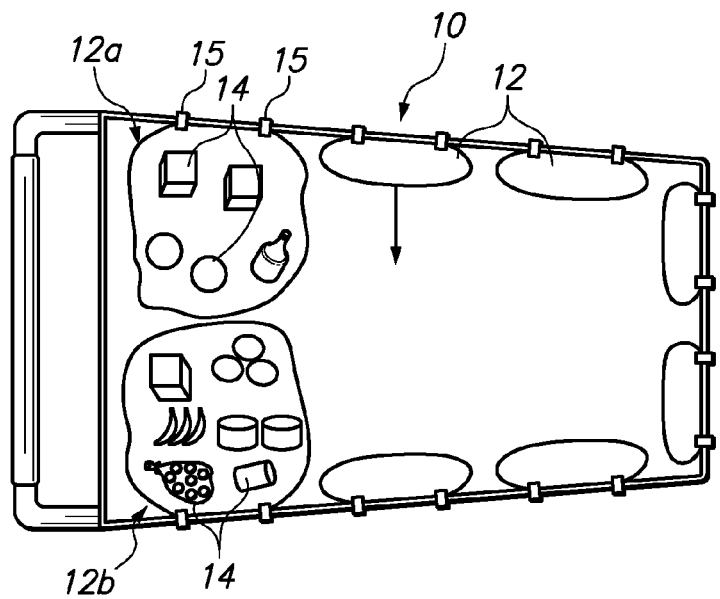
FIG. 1 is a top view of a shopping cart having a plurality of shopping bags removably secured to the perimeter of the shopping cart with clips.

The present invention provides improved methods of item tracking that can greatly improve the shopping experience for customers and employees of so-called "brick-and-mortar" stores, i.e. stores that serve customers in a building as contrasted to an online business. Aspects of the invention include simplified inventory tracking, containing and organizing selected goods to be purchased, and methods of expediently checking out customers at the completion of shopping. The invention is particularly useful in the context of shopping in a supermarket or department store wherein shopping carts are provided at the store for the customers to transport selected items to be purchased. Thus, embodiments of the invention will be discussed below largely in the context of a supermarket application. However, one skilled in the art having benefit of this disclosure will recognize other applications within the scope of the invention that involve brick-and-mortar shopping environments.

One embodiment of the invention provides an improved method of shopping at a brick-and-mortar store, such as a supermarket or department store. The customer selects and bags for-sale items while the customer shops. Bagging the items while shopping saves time and money by eliminating the need to have an employee or the customer handle the items a second time in order to bag the items at checkout, and also allows the customer to group the items as the customer desires. The items are pre-tagged with an RFID tag, and an RFID scanner is provided at a checkout station. The multi-directional nature of RFID scanners allows the contents of an entire bag to be scanned and identified, which allows the items to remain in the bags as grouped by the customer prior to checkout. However, the invention is not limited to embodiments using RFID scanning technology, and alternative technologies for remotely machine-reading the contents of a shopping bag in a multi-directional manner may be used instead of RFID technology, whether such technology is now known or later developed. The bags are typically sized for ease of handling and carrying, but are also conveniently sized for RFID scanning, because they are appreciably smaller than an entire shopping cart. Thus, tagged items are detected much more reliably as compared to scanning an entire shopping cart at once. Yet, the process of scanning an entire bag of items at once is much more efficient than individually scanning each item, such as is presently done in conventional UPC-based systems. UPC labels having barcodes may still be provided on items, however, either for redundancy or as a backup system, such as for oversized items that do not readily fit into one of the bags.

The checkout station includes an unloading zone where the customer brings his or her shopping cart. Audible and visual alerts may be electronically provided to guide the customer in positioning the shopping cart to the unloading zone. Another shopping cart is provided in a loading zone. As the customer moves the bags from the shopping cart in the unloading zone to the shopping cart in the loading zone, each bag is scanned by the RFID scanner. Redundant RFID scanners may be provided to increase reliability of the data collected, and a UPC scanner may be provided as a backup or supplementary device. The shopping carts at the loading zone and unloading zone may be weighed and the weights compared to guard against possible theft of goods. When all of the items have been scanned and paid for, the customer may leave the checkout station with the cart at the loading zone.

FIG. 1 is a top view of an exemplary first shopping cart 10 having a plurality of shopping bags 12 removably secured to the perimeter of the first shopping cart 10 with clips 15. This arrangement of the bags in the first shopping cart 10 at the outset of a customer's shopping session allows the customer to select and bag for-sale items while the customer shops. The clips 15 provide one relatively low-cost example of a way to removably secure the bags 12 to the first shopping cart 10. The clips 15 secure a supply of the bags 12 in a convenient arrangement for filling the bags 12 as they are filled with items 14. The bag 12 may come in a variety of sizes, but preferably occupies only a fraction of the volume of a shopping cart, so that several bags may be placed in the first shopping cart 10. However, the bags 12 are preferably large enough to hold several items. The bag need not be made of any special material, and common materials such as plastic or paper may be used, so long as they are permeable to signals of the type used to communicate between an RFID scanner and RFID tags. As the bags 12 are filled with items 14, the bags 12 expand generally toward the center of the cart. To help optimize the use of shopping-cart space, the bags 12 may be sized so that when all the bags 12 are full they touch adjacent bags, as illustrated by the way that filled bag 12A touches filled bag 12B. The first shopping cart 10 has wheels (not shown), like conventional shopping carts, allowing the customer to easily push the first shopping cart 10 and its contents around the store and, eventually, to proceed to a checkout station. This bagging system using the clips 15 is just one example of an efficient, convenient, and low-cost way of managing the contents of the first shopping cart 10 and the bags 12 while the customer shops. Other, more-specialized or less-specialized bagging and cart-management systems may be devised that are compatible with other inventive aspects discussed herein. No specialized bagging system is needed, however, and the customer may simply gather and bag the selected items 12 and place the filled bags in the first shopping cart 10 as the customer shops.

The for-sale items may be provided throughout the store, such as on store shelves and in bins. The goods may be grouped in sections of the store according to type, such as in aisles or sections devoted to pre-packaged goods, produce, fruits and vegetables, pharmacy items, dairy, and others. The store sections may be further grouped according to temperature, such as refrigerated, non-refrigerated, or cooked/hot sections. The embodiment provides a "bag-as-you-go" shopping experience, wherein most or all the selected goods may be bagged by the customer before the customer proceeds to a checkout station. The bag-as-you-go system has numerous advantages. It allows the customer to group the items as the customer desires. This allows the customer to organize the goods according to where the customer wants to the goods to be placed at home. For example, the customer might want to group refrigerated items together in one bag, pharmacy items together in another bag, and spices in yet another bag, so that these items may be more efficiently put away at the customer's home. Additionally, the bag-as-you-go shopping experience makes shopping more efficient, by eliminating the cost and time of having store employees manually bag the goods at the conclusion of the customer's shopping session. Thus, when the customer gets to the checkout station, the focus may be on scanning the items by the bag and paying for the items, rather than individually scanning and bagging the items as in a conventional store. Furthermore, the bag-as-you-go approach saves the store money in terms of staff and floor space. This approach also relieves the store of the responsibility for how the items are bagged and helps ensure that the customer leaves the checkout station with all the items purchased by the customer.

Figure 2:
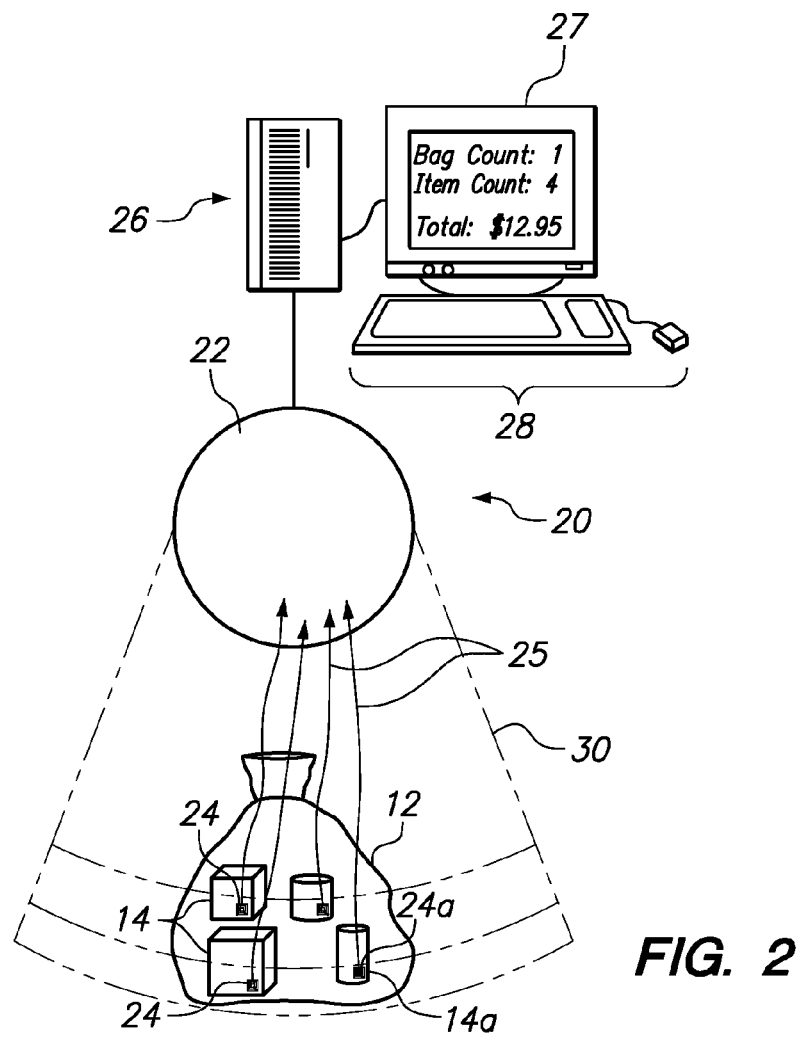
FIG. 2 is a schematic drawing of an RFID-based scanning system that may be used to identify the contents of each bag.

FIG. 2 is a schematic drawing of an RFID-based scanning system 20 that may be used to remotely machine-read the contents of each bag 12 at checkout. The scanning system 20 includes an RFID scanner 22 that is schematically shown as a "dome." The RFID scanner 22 may be any of a variety of RFID scanners known in the art, configured for remotely machine-reading an RFID tag 24 affixed to each item 14 when the RFID tag 24 is within a "zone of readability" 30 of the scanner 22. An RFID tag 24 positioned within the zone of readability 30 is within readable proximity of the scanner 22. Each RFID tag 24 outputs an identification signal 25 in response to radio-frequency stimulus from the scanner 22, which transmits information back to the scanner 22 as to the identity of the scanned item. The process by which RFID scanners read RFID tags are known in the art and an in-depth discussion of RFID technology is therefore omitted. The zone of readability 30 may vary from that shown in the drawing. In particular, the zone of readability 30 is not necessarily directional, as portrayed. The zone of readability 30 may be fairly wide or fairly narrow, and the width may be controlled somewhat by virtue of how the scanner 22 is positioned and configured. Another advantage of using radio waves is that the RFID scanner 22 does not need to have a clear line of sight of the RFID tag 24 in the way that a UPC label generally needs to be within the line of sight of a UPC scanner. Thus, due to the use of radio waves in RFID tag-detection, the zone of readability 30 is typically spatially broader than a zone of readability of a UPC scanner configured for optically reading a UPC label in the line of sight of the UPC scanner.

A processing system 26 included with the scanning system 20 is schematically illustrated here as a computer with an electronic display 27 and peripherals 28 for processing and displaying information contained within the signals emitted by the RFID tags 24 and received by the scanner 22. The processing system 26 may be or include a computerized register having access to a database correlating the identity of the scanned goods with product information such as price. The identity and product information may be processed by the processing system 26 and displayed on the electronic display 27. This may include, for example, displaying the price information of each scanned item, a total price of the scanned items, and receiving and processing payment.

Each RFID tag 24 may identify the respective item 14 with more, less, or about the same degree of particularity that a conventional UPC label might require. For example, if the item 14A were a can of soup, the tag 24A may uniquely identify the respective item 14A as being in the category defined by the specific brand and flavor of soup, without necessarily distinguishing this particular can of soup from another identical can of soup in that category. However, RFID tags have the capability of producing a larger set of unique identities than UPC labels. Thus, the RFID tag 24A may have the capability of more uniquely identifying the item 14A than a conventional UPC label. The RFID tag 24A may identify the item 14A with as much particularly as a serial number, to distinguish that particular can of soup 14A from another, otherwise identical can of soup of the same category.

Figure 3:
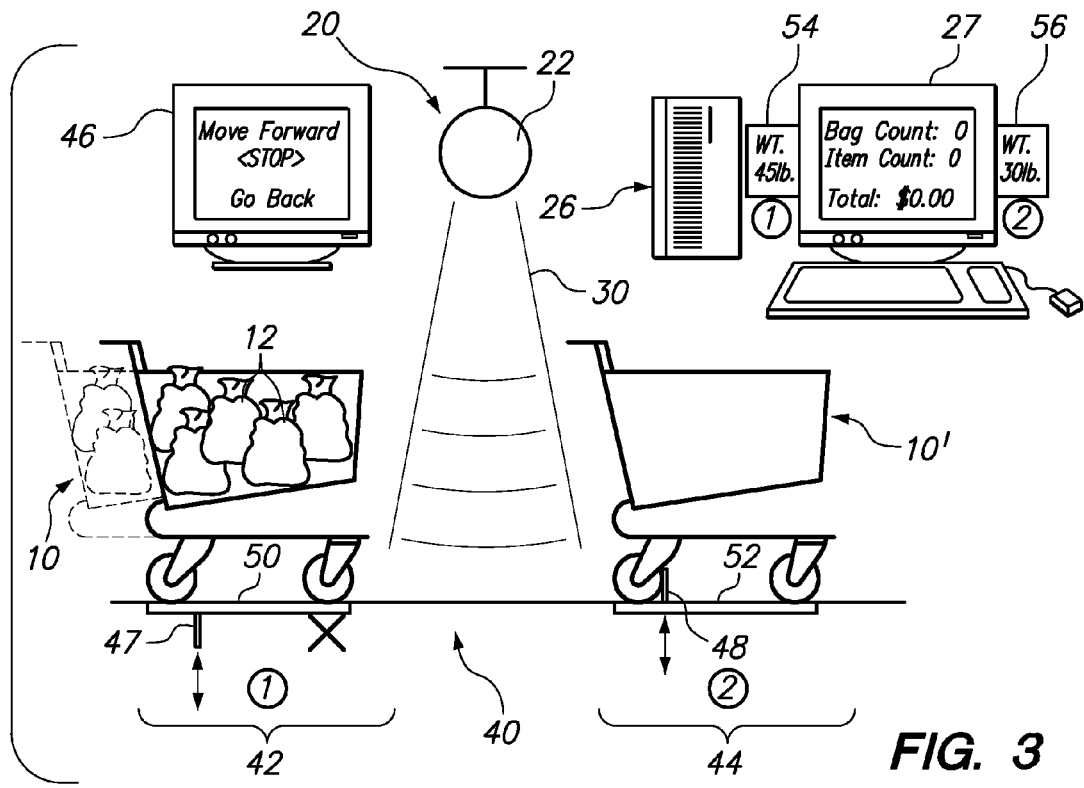
FIG. 3 is a side view of a checkout station according to one embodiment of the invention.

FIG. 3 is a side view of a checkout station 40 according to one embodiment of the invention. The first shopping cart 10, first discussed in reference to FIG. 1, is now shown positioned at an unloading zone 42 at the checkout station 40, after having been loaded by the customer with several filled bags 12. Another, currently empty "second" shopping cart 10' is positioned at an unloading zone 44. The RFID scanner 22 is positioned between the unloading zone 42 and the loading zone 44, so that as bags 12 are moved from the first shopping cart 10 to the second shopping cart 10' they pass through the zone of readability 30, i.e. within readable proximity to the scanner 22.

An electronic guide sign 46 is optionally provided to guide the customer in positioning the first shopping cart 10 at the unloading zone 42. The guide sign 46 optionally displays messages such as "move forward," "stop," and "go back" to visually direct the user where to position the first shopping cart 10. Sensors (e.g. electromechanical proximity sensors) may detect the position of the first shopping cart 10 relative to the unloading zone 42. For example, as the first shopping cart 10 begins to enter the unloading zone 42, the guide sign 46 may display the message "move forward," to instruct the customer to continue pushing the first shopping cart 10 forward. Once the first shopping cart 10 is correctly positioned, the guide sign 46 may display the message "stop." An optional locking mechanism such as a solenoid-type actuator 47 may be used to releasably lock the first shopping cart 10 in place once the first shopping cart 10 is correctly positioned in the unloading zone 42. The actuator 47 is shown in an unlocked position wherein the first shopping cart 10 is free to move. The actuator 47 may be actuated upwardly to provide a wheel stop to releasably lock the first shopping cart 10 in place. Another optional locking mechanism such as a solenoid-type actuator 48 may be used to releasably lock the second shopping cart 10' in place at the loading zone 44. The actuator 48 is currently shown in the locked position, moved upward to lock the second shopping cart 10' in place. Various actuator types and configurations may be substituted for those shown, as will be recognized by those having skill in the art.

A mass or weight sensor ("scale") 50 may be provided at the unloading zone 42 for weighing the first shopping cart 10 and its contents, and a scale 52 may be provided at the loading zone 44 for weighing the second shopping cart 10' and its contents. The scale 50 generates a signal representative of the weight of the first shopping cart 10 and outputs the signal to the processing system 26, which interprets the signal and displays the weight of the first shopping cart 10 at a display window 54. The scale 52 generates a signal representative of the weight of the second shopping cart 10' and outputs the signal to the processing system 26, which interprets the signal and displays the weight of the second shopping cart 10' at a display window 56. By way of example, the first shopping cart 10 along with its contents is shown in FIG. 3 as weighing forty-five pounds, and the empty second shopping cart 10' is shown as weighing thirty pounds. The first and second shopping carts 10, 10' may be substantially identical and have the same weight when empty, so that any difference in weight between the first and second shopping carts 10, 10' may be attributed solely to the weight of the contents of the respective shopping carts 10, 10'. Thus, the processing system 26 may determine that the currently full first shopping cart 10 includes fifteen pounds of groceries (forty-five minus thirty pounds). As will be further explained below, these weights will be used later to verify the correct transfer of the contents of the first shopping cart 10 to the second shopping cart 10', which may be used for loss-prevention.

Figure 4:
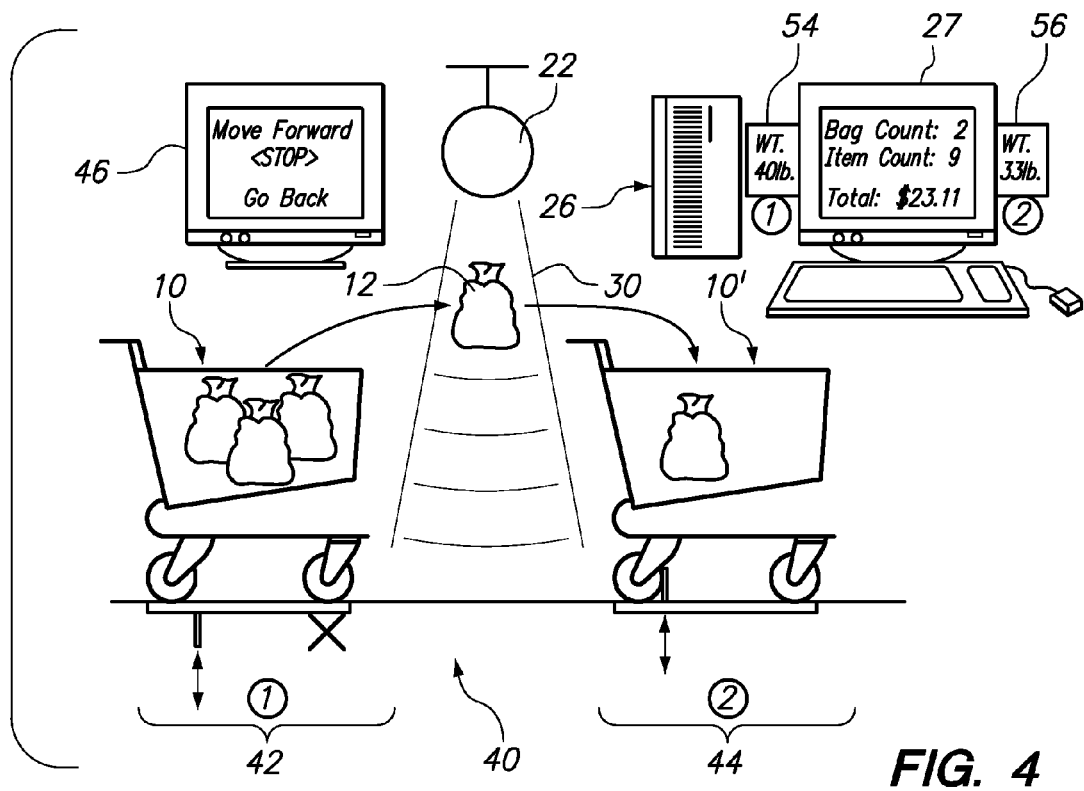
FIG. 4 is a side view of the checkout station in the process of unloading the first shopping cart from the unloading zone and loading the second shopping cart at the loading zone.

FIG. 4 is a side view of the checkout station 40 as the contents of the first shopping cart 10 at the unloading zone 42 are transferred to the second shopping cart 10' at the loading zone 44. Each bag 12 is passed through the zone of readability 30 of the scanner 22 as it is moved from the first shopping cart 10 to the second shopping cart 10'. When a bag 12 is within the zone of readability 30, the scanner is able to read all RFID tags within the bag 12, regardless of the orientation of the RFID tags. The scanner 22 may be configured to detect the presence of items 12 and/or the associated RFID tags 24 when positioned within the zone of readability 30, and to automatically read those RFID tags 24 in response. Alternatively, the scanning system 20 may be configured to scan for RFID tags 24 in the zone of readability 30 in response to a command from the user, such as in response to a user pushing a button. The bag 12 may remain closed while the RFID tags 24 therein are read, because the bag is transparent to the radio waves used to communicate between the RFID tags and the scanner 22. Because the volume of the filled bag 12 is much smaller than the open volume of the entire first shopping cart 10, the scanner 22 can scan the entire contents of the bag 12 with far more reliability than the scanner would be capable of reading if the entire contents of the first shopping cart 10 were scanned at once. Whereas most conventional RFID scanners would be incapable of reliably detecting items near the center of a full shopping cart, existing RFID scanners may be capable of scanning all of the contents of each bag 12 when the bags 12 are passed one at a time through the zone of readability 30. The processing of scanning the items 14 one bag at a time is markedly faster than scanning items individually, as in prior art UPC-based systems.

It should be noted that different types of RFID tags, e.g. active, passive, or semi-passive, may be selected for use with the scanning system 20, depending on the desired results. For example, passive RFID tags generally must pass in closer proximity to an RFID scanner than would active RFID tags. Thus, a passive RFID tag may be used with the scanning system 20 to avoid the scanner 22 inadvertently detecting unintended items, such as items in another customer's shopping cart at another checkout station, or items in the other bags 12 while they are still in the first shopping cart 10. Alternatively, active RFID tags typically provide a higher degree of reliability when being read, due in part to the fact that an active RFID tag and the scanner 22 can establish a communication "session" that verifies proper reading of the active RFID tag. Techniques known in the art may be used for controlling the zone of readability 30 so that the zone of readability 30 does not extend appreciably outside of the checkout station 40, to minimize the likelihood of unintentionally reading items from neighboring checkout stations.

Still referring to FIG. 4, the display 27 registers information about the items being scanned. Exemplary information shown in the figure includes the bag count, total item count, and subtotal. For example, five bags 12 are being transferred, one at a time, from the first shopping cart 10 to the second shopping cart 10'. One bag has already been scanned and placed in the second shopping cart 10', another bag is currently being scanned and is in the zone of readability 30, and three other bags remain in the first shopping cart 10 to be unloaded to the second shopping cart 10'. Thus, the current bag count is two bags, the cumulative item count is nine items, and the current subtotal is $23.11. To obtain the subtotal, each scanned item is identified by the processing system 26 and cross-referenced within a database to obtain price information and possibly other information. Thus, the price of each item scanned is factored into the subtotal, which may be readily computed by the processing system 26 along with the bag count, item count, and other information. As the bags 12 are moved, one at a time, from the first shopping cart 10 to the second shopping cart 10', the weights are updated in real time in the display windows 54, 56. In FIG. 4, the gross weight of the first shopping cart 10 is currently forty pounds while the gross weight of the second shopping cart 10' is currently thirty-three pounds. In this example, the bag 12 being moved from the first shopping cart 10 to the second shopping cart 10' (currently in neither cart) weighs two pounds, which can be determined by subtraction.

Figure 5:
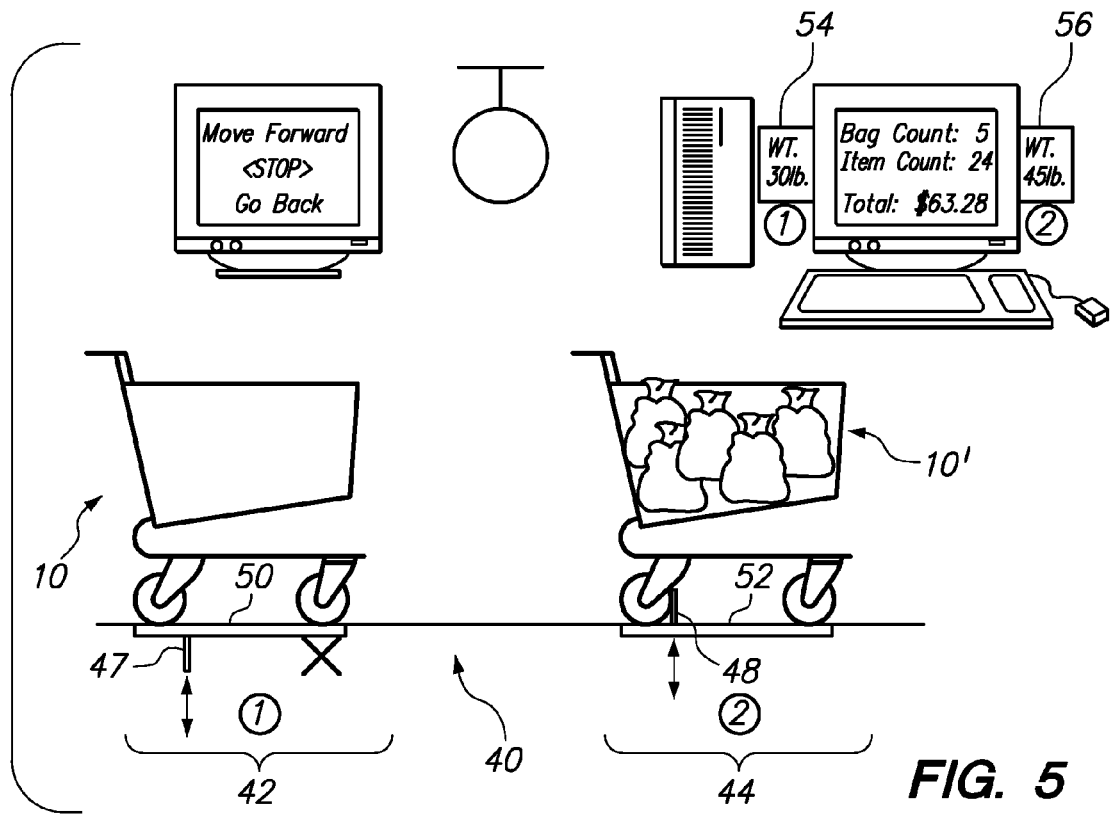
FIG. 5 is a side view of the checkout station a moment after all five bags have been moved from the first shopping cart to the second shopping cart.

FIG. 5 is a side view of the checkout station 40 after all five bags 12 have been moved from the first shopping cart 10 to the second shopping cart 10'. Thus, the first shopping cart 10 has been completely unloaded while at the unloading zone 42, and the second shopping cart 10' has been loaded with the items unloaded from the first shopping cart 10. The shopping carts 10, 10' may remain locked in position by the actuators 47, 48, as shown, while the customer pays and the weights are verified. The display window 54 now shows a weight of thirty pounds for the empty first shopping cart 10, which is the same weight as when the second shopping cart 10' was empty in FIG. 3. Likewise, the second shopping cart 10' is registering a gross weight of forty-five pounds on the second display screen 56, which is the same weight as the full first shopping cart 10 had in FIG. 3. These weights reasonably confirm that the fifteen pounds of bagged items have been transferred from the first shopping cart 10 to the second shopping cart 10', and are fully accounted for. If, on the other hand, the second display screen 56 were registering a gross weight of more than forty-five pounds, then the processing system 26 may generate an alert for the attention of a store employee. In response to such an alert, the employee can then check whether any unaccounted items made it into the second shopping cart 10'. Among other things, this feature may be used to help detect and prevent potential theft.

Figure 6:
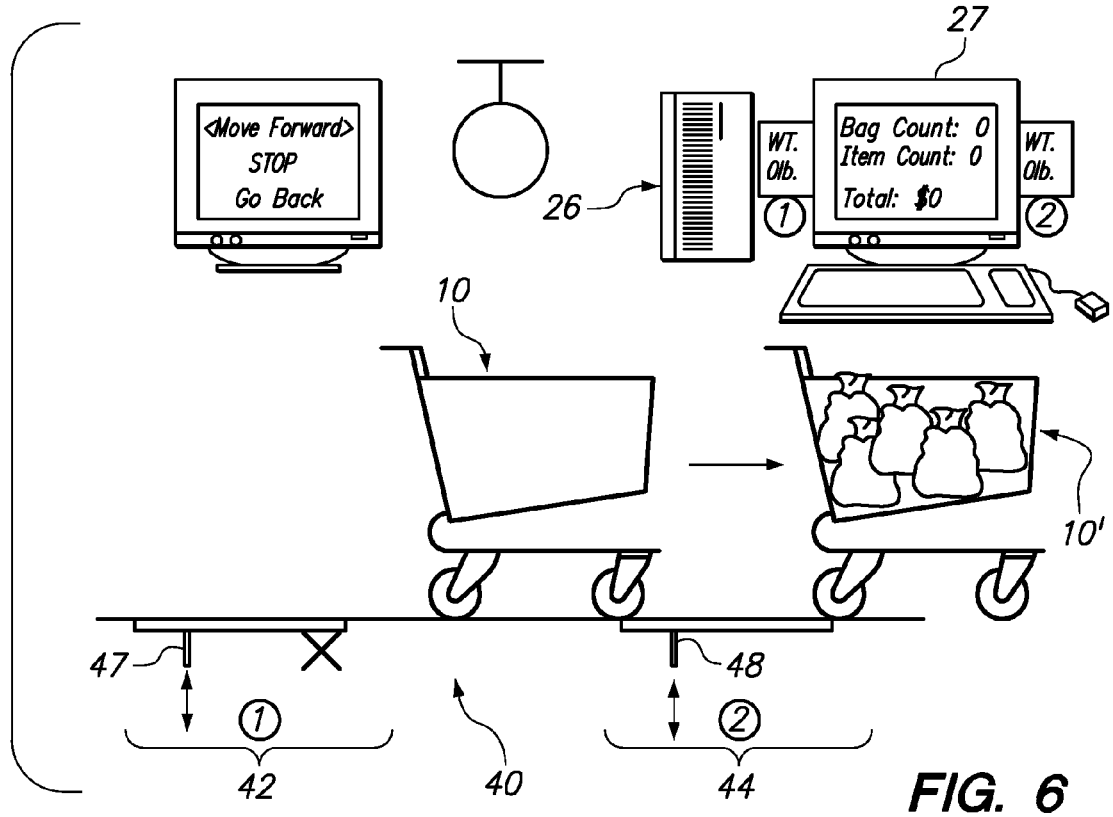
FIG. 6 is a side view of the checkout station after the customer has finished checking out.

FIG. 6 is a side view of the checkout station 40 after the customer has finished checking out. This might happen, for example, after the contents of the second shopping cart 10' have been verified and the customer has paid for the items. The two actuators 47, 48 have been moved to their respective unlocking positions (in this embodiment, by moving downward), which allows the shopping carts 10, 10' to be moved. The customer may then transport the second shopping cart 10' and its contents from the checkout to the customer's vehicle. As the second shopping cart 10' is moved out of the loading zone 44, the first shopping cart 10 may be moved from the unloading zone 42 to the loading zone 44 for the next customer in line. Another customer, having a "third" shopping cart, may then move the third shopping cart to the unloading zone 42. The process of unloading and scanning items from the unloading zone 42 to the loading zone 44 may be repeated, this time with the third shopping cart being in the unloading zone 42 and the first shopping cart 10 now in the loading zone 44.

Figure 7:
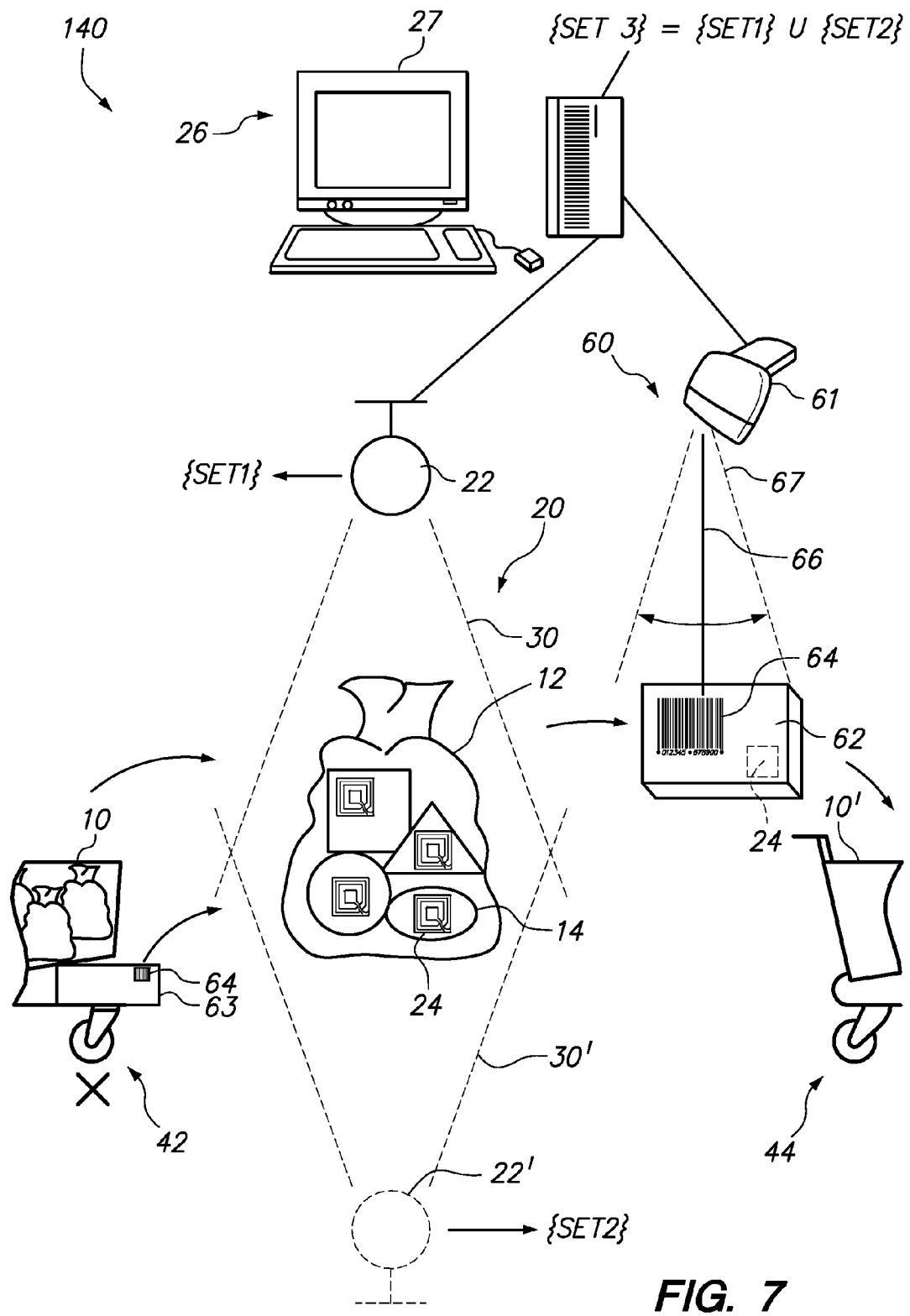
FIG. 7 is a side view of an alternative embodiment of a checkout station, including both the RFID scanning system and a UPC scanning system.

FIG. 7 is a side view of an alternative embodiment of a checkout station 140, including both the RFID-based scanning system 20 and a UPC scanning system 60. The UPC scanning system 60 includes a UPC scanner 61 for scanning items 62 having a conventional UPC label 64. As illustrated, the optical beam 66 from the UPC scanner 61 is considerably narrower than the zone of readability 30 of the RFID scanner 22. The optical beam 66 may be movable, either by moving the scanner 61 or by controlling the optics within the scanner 61, to increase the zone of readability 67 of the UPC scanner 61. However, the optical beam 66 remains directional and must have a line of sight with the UPC label 64, as contrasted with the multi-directional nature of the RFID scanner 22. The item 62 may include an RFID tag 24, along with the UPC label 64. This is useful, for example, if the RFID-based scanning system 20 is temporarily unavailable (e.g. in need of repair), in which case the UPC scanning system 60 might be used as a backup. Another benefit of including the UPC scanning system 60 at the checkout station 40, however, is that some for-sale items at the store may not include an RFID tag. For example, as new systems according to the invention are phased in, many items in the stream of commerce may still only include the UPC label 64. Another practical reason for including the UPC scanning system 60 is that some items may be too large to be bagged in one of the bags 12. To illustrate, an oversized item 63 positioned on the lower level of the first shopping cart 10 is too large to bag. This oversized item 63 may be passed under the UPC scanner 61 as the oversized item 63 is moved from the first shopping cart 10 to the second shopping cart 10'. Conveniently, the RFID scanner 22 and UPC scanner 62 may be positioned closely together, so that the trajectory of the oversized item 63 being passed under the UPC scanner 61 from the first shopping cart 10 to the second shopping cart 10' is similar to the trajectory of one of the bags 12 being moved under the RFID scanner 22 from the first shopping cart 10 to the second shopping cart 10'.

Another feature of the checkout station 40 is the inclusion of an optional, secondary RFID scanner 22'. The secondary RFID scanner 22' allows the bag 12 in the zone of readability 30 to be scanned from another direction. The secondary scanner 22' includes its own zone of readability 30'. The union of the two zones of readability 30+30' may intersect as shown. In this example, the scanner 22 remotely machine reads the bag 12 from above, and the scanner 22' remotely machine reads the bag 12 from below. However, other arrangements of the scanners 22 and 22' are possible, such as side-by-side. Any number of RFID scanners may be included at different positions to remotely machine read from still further positions. The secondary scanner 22' provides redundant or backup reading of the contents of the bag 12. This can be especially useful for reading the contents of a larger bag, to ensure all the items in the larger bag are read. The scanner 22 reads the bag 12 and outputs a signal listing the read contents as SET 1. The scanner 22' reads the bag 12 and outputs a signal listing the read contents as SET 2. SET 1 and SET 2 may be compared to verify one another. If SET 1=SET 2, then the results of the reading by the scanner 22 reasonably verifies the results of the reading by the scanner 22', and vice versa. If the processing system 26 detects any discrepancies, i.e. if SET 1 is not equal to SET 2, then the processing system 26 may trigger an alarm for attention of a store employee. Alternatively, the contents of the bag 12 may be reported as a SET 3 which is the union of SET 1 and SET 2. For example, the radio waves emitted by the scanner 22 may be capable of penetrating the bag 12 from above deeply enough to read the upper two-thirds of the bag 12, while the lower scanner 22' may be capable of penetrating the bag 12 from below deeply enough to read the bottom two-thirds of the bag 12. The arithmetic union SET 3 of the two sets SET 1 and SET 2 would then likely yield a complete listing of the contents of the bag 12, even in situations wherein neither RFID scanner 22, 22' alone can obtain the complete listing of the contents. However, where the bag contains multiple units of the same item, the bag may be sent back through the zone or readability on its side in an attempt to get identical readings. If this doesn't resolve the difficulty, then the items may need to be scanned individually or manually search the bag to identify the correct number of items.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
providing a plurality of for-sale items in a brick-and-mortar store, wherein each item comprises an identification tag that uniquely identifies the item or category of item;
placing one or more of the items in a first shopping cart, and transporting the first shopping cart to a checkout station;
positioning the first shopping cart at an unloading zone at the checkout station and positioning a second shopping cart at a loading zone at the checkout station;
moving the items from the first shopping cart to the second shopping cart and using at least one tag-reading machine to remotely machine-read the identification tags on each item being moved to the second shopping cart;
identifying each item having an identification tag in response to the machine-reading; and
detecting when the first shopping cart is in the unloading zone and, in response, automatically locking the first shopping cart in place until all of the items have been moved from the first shopping cart to the second shopping cart.

2. The method of claim 1, further comprising:
providing a plurality of shopping bags to a customer, the customer selecting some of the for-sale items, placing one or more of the selected items in each shopping bag, and transporting the filled shopping bags in the first shopping cart to the checkout station,
wherein the items are identified by the tag-reading machine as each shopping bag is moved from first shopping car to the second shopping cart without removing the items from the shopping bag.

3. The method of claim 2, wherein the identification tags comprise RFID tags and the step of remotely machine-reading the identification tags in the shopping bag comprises using an RFID scanner to read the RFID tags.

4. The method of claim 2, further comprising computing one or more of the quantity of for-sale items in each filled shopping bag, the price of each item in the filled shopping bags, the total price for all of the items in the filled shopping bags, and the number of filled shopping bags.

5. The method of claim 2, further comprising removably fastening the shopping bags to the first shopping cart prior to the customer selecting some of the for-sale items and placing the selected items in each shopping bag.

6. The method of claim 2, wherein the tag-reading machine is positioned between the loading zone and the unloading zone, such that the shopping bags are passed in proximity to the tag-reading machine as the shopping bags are moved from the first shopping cart to the second shopping cart.

7. The method of claim 2, further comprising:
removing the second shopping cart from the loading zone after all of the filled shopping bags have been moved from the first shopping cart to the second shopping cart;
moving the first shopping cart from the unloading zone to the loading zone after the second shopping cart has been removed from the loading zone;
another customer moving a third shopping cart containing one or more other customer-filled shopping bags to the unloading zone after the first shopping cart has been moved to the loading zone; and
moving different filled shopping bags from the third shopping cart to the first shopping cart and using the tag-reading machine to remotely machine-read all of the identification tags in each different filled shopping bag being moved to the first shopping cart without removing items from the different filled shopping bag, and identifying each item having the identification tag in response to the machine-reading.

8. The method of claim 2, further comprising:
weighing the first shopping cart at the unloading zone prior to moving the filled shopping bags from the first shopping cart to the second shopping cart;
weighing the second shopping cart after the filled shopping bags have been moved from the first shopping cart to the second shopping cart; and
generating an alert in response to determining the actual weight of the second shopping cart does not equal an expected weight of the second shopping cart after all of the items have been moved from the first shopping cart to the second shopping cart.

9. The method of claim 2, further comprising:
the customer selecting a first set of for-sale items having RFID tags and placing the first set in the shopping bags and the customer selecting a second set of items having UPC labels and no RFID tags and placing the second set in the first shopping cart without placing the second set into the shopping bags;

providing a UPC scanner and an RFID scanner at the checkout station; and using the RFID scanner to remotely machine-read all of the RFID tags in the selected first set of for-sale items, and using the UPC scanner to read the UPC labels provided with the second set of for-sale items.

10. The method of claim 2, further comprising:

releasably securing a plurality of the shopping bags along a perimeter of the first shopping cart prior to the customer selecting some of the for-sale items and placing one or more of the selected items in each shopping bag.

11. The method of claim 1, further comprising:

detecting when the first shopping cart is in proximity to the unloading zone as the first shopping cart is transported to the checkout station; and electronically, visually or audibly guiding the customer in moving the first shopping cart to the unloading zone.

12. A method, comprising:

providing a plurality of for-sale items in a brick-and-mortar store, wherein each item comprises an identification tag that uniquely identifies the item or category of item;

placing one or more of the selected items in a first shopping cart, and transporting the first shopping cart to a checkout station;

positioning the first shopping cart at an unloading zone at the checkout station and positioning a second shopping cart at a loading zone at the checkout station;

locking the second shopping cart in the loading zone;

moving the items from the first shopping cart to the second shopping cart and using at least one tag-reading machine to remotely machine-read all of the identification tags on each item being moved to the second shopping cart;

identifying each item having an identification tag in response to the machine-reading weighing the first shopping cart at the unloading zone prior to moving the items from the first shopping cart to the second shopping cart;

weighing the second shopping cart after the items have been moved from the first shopping cart to the second shopping cart; and generating an alert in response to determining the actual weight of the second shopping cart does not equal an expected weight of the second shopping cart after all of the items have been moved from the first shopping cart to the second shopping cart; and unlocking the second shopping cart only if the weight gained by the second shopping due to receiving the items is substantially equal to the weight loss of the first shopping cart due to removal of the items.

13. The method of claim 12, further comprising:

providing a plurality of shopping bags to a customer, the customer selecting some of the for-sale items, placing one or more of the selected items in each shopping bag, and transporting the filled shopping bags in the first shopping cart to the checkout station, wherein the items are identified by the tag-reading machine as each shopping bag is moved from first shopping car to the second shopping cart without removing the items from the shopping bag, and wherein the second shopping cart is unlocked only if the weight gained by the second shopping due to receiving the filled shopping bags is substantially equal to the weight loss of the first shopping cart due to removal of the filled shopping bags.

14. The method of claim 13, further comprising:

using a plurality of tag-reading machines positioned at different locations at the checkout station to collectively, remotely machine-read all of the identification tags in each shopping bag being moved to the second shopping cart without removing the items from the shopping bag.

15. A method, comprising:

providing a plurality of for-sale items in a brick-and-mortar store, wherein each item comprises an identification tag that uniquely identifies the item or category of item;

placing one or more of the selected items in a first shopping cart, and transporting the first shopping cart to a checkout station;

positioning the first shopping cart at an unloading zone at the checkout station and positioning a second shopping cart at a loading zone at the checkout station;

moving the items from the first shopping cart to the second shopping cart and using a plurality of tag-reading machines positioned at different locations at the checkout station to collectively, remotely machine-read the identification tags on each item being moved to the second shopping cart;

identifying each item having an identification tag in response to the machine-reading; and using each of the plurality of tag-reading machines to obtain a list of the machine-read items, comparing the lists obtained by the tag-reading machines, and identifying any discrepancies between the lists of tagged items.

16. The method of claim 15, further comprising:

providing a plurality of shopping bags to a customer, the customer selecting some of the for-sale items, placing one or more of the selected items in each shopping bag, and transporting the filled shopping bags in the first shopping cart to the checkout station, wherein the items are identified by the plurality of tag-reading machine as each shopping bag is moved from first shopping car to the second shopping cart without removing the items from the shopping bag, and wherein each of the plurality of tag-reading machines is used to obtain a list of tagged items in each shopping bag, comparing the lists obtained by the tag-reading machines for each shopping bag, and identifying any discrepancies between the lists of tagged items in each shopping bag.

17. The method of claim 16, further comprising:

reporting the contents of each filled shopping bag as the union of all of the lists obtained for that shopping bag.

18. A method, comprising:

providing a plurality of tagged for-sale items in a brick-and-mortar store, each tagged item comprising a remotely machine-readable identification tag that uniquely identifies the tagged item or category of item;

providing untagged for-sale items that do not have the identification tag;

providing containers for the untagged items and a tag-making machine for tagging the containers, the customer placing the untagged items in the container and creating a tag using the tag-making machine for the container that identifies the contents of the untagged items in the container;

placing one or more of the selected tagged items and the tagged container in a first shopping cart, and transporting the first shopping cart to a checkout station;

positioning the first shopping cart at an unloading zone at the checkout station and positioning a second shopping cart at a loading zone at the checkout station;

moving the items and the containers from the first shopping cart to the second shopping cart and using at least one tag-reading machine to remotely machine-read all of the identification tags on the items and the containers being moved to the second shopping cart; and identifying each tagged item in response to the machine-reading.

19. The method of claim 18, further comprising:

providing a plurality of shopping bags to a customer, the customer selecting some of the tagged items, placing one or more of the selected tagged items in each shopping bag, and transporting the filled shopping bags in the first shopping cart to the checkout station, wherein the tagged items are identified by the tag-reading machine as each shopping bag is moved from first shopping car to the second shopping cart without removing the tagged items from the shopping bag.

\* \* \* \* \*